(12) United States Patent
Kang

(10) Patent No.: US 9,385,633 B2
(45) Date of Patent: Jul. 5, 2016

(54) LARGE SCALE ENERGY STORAGE SYSTEM ENABLING BALANCED CONTROL OF INVERTERS

(71) Applicant: DIK Co., LTD., Chuncheon-si, Gangwon-do (KR)

(72) Inventor: Moon Soo Kang, Gimpo-si (KR)

(73) Assignee: DIK CO., LTD., Chuncheon-si, Gangwon-do (KR)

( * ) Notice: Subject to any disclaimer, the term of this patent is extended or adjusted under 35 U.S.C. 154(b) by 3 days.

(21) Appl. No.: 14/664,925

(22) Filed: Mar. 23, 2015

(65) Prior Publication Data

US 2015/0303830 A1    Oct. 22, 2015

(30) Foreign Application Priority Data

Apr. 21, 2014 (KR) .......................... 10-2014-0047376

(51) Int. Cl.
*H02M 1/092* (2006.01)
*H02M 7/5395* (2006.01)
*H02J 3/38* (2006.01)
*H02M 7/493* (2007.01)

(52) U.S. Cl.
CPC .............. *H02M 7/5395* (2013.01); *H02J 3/381* (2013.01); *Y02E 60/60* (2013.01)

(58) Field of Classification Search
CPC ....... H02M 1/084; H02M 1/092; H02M 7/44; H02M 7/48; H02M 7/493; H02M 7/497; H02M 7/501; H02M 7/53; H02M 7/537; H02M 7/5381; H02M 7/53862; H02M 7/5395
See application file for complete search history.

(56) References Cited

U.S. PATENT DOCUMENTS

| | | | | |
|---|---|---|---|---|
| 8,866,348 B2* | 10/2014 | Venhaus | ................. | H02M 7/49 307/151 |
| 2012/0014147 A1* | 1/2012 | Radosevich | ........ | H02M 1/0845 363/71 |
| 2012/0063187 A1* | 3/2012 | Sato | .................... | H02M 3/3374 363/131 |
| 2015/0138855 A1* | 5/2015 | Park | ....................... | H02M 7/42 363/71 |

FOREIGN PATENT DOCUMENTS

| | | |
|---|---|---|
| JP | H11-164483 A | 6/1999 |
| JP | 2001-186663 A | 7/2001 |
| JP | 2013-066378 A | 4/2013 |

* cited by examiner

*Primary Examiner* — Gary L Laxton
(74) *Attorney, Agent, or Firm* — Park, Kim & Suh, LLC

(57) ABSTRACT

There is disclosed a large scale energy storage system enabling balanced control of inverters, the large scale energy storage system including an inverter controller comprising a PWM generation circuit configured to generate a reference PWM signal and a first O/E converter configured to convert the reference PWM signal transmitted from the PWM generation circuit into an optical signal and to output the optical signal, and a plurality of PCS inverters configured to output a grid voltage, each of the PCS inverters comprising a second O/E converter embedded therein to convert the PWM signal and the optical signal output from the inverter controller into an optical signal and a plurality of inverter modules.

5 Claims, 5 Drawing Sheets

LARGE SCALE ENERGY STORAGE SYSTEM ENABLING BALANCED CONTROL OF INVERTERS

Pursuant to 35 U.S.C. §119(a), this application claims the benefit of earlier filing date and right of priority to Korean Application No. 10-2014-0047376, filed on Apr. 21, 2014, the contents of which are hereby incorporated by reference herein in their entirety.

BACKGROUND OF THE DISCLOSURE

1. Field of the Disclosure

Embodiments of the present disclosure relates to a large scale energy storage system, more particularly, to a large scale energy storage system which may enable balanced control operations between inverters so as to balance inverters modules connected in parallel.

2. Background of the Disclosure

With recent global industry acceleration, energy demands are consistently increasing and continuous usage of fossil fuel is increasing carbon dioxide emissions, only to bring serious weather change. Engineering solutions for such problems are needed.

A distributed power supply and spread policy is positively pushed in accordance with recent government lead green growth vision. Sudden rise of oil price leads investments of big businesses and small and venture businesses so that relevant markets are rapidly expanded.

However, new regeneration energy can be seriously affected by location environment and natural conditions and output variation of the new regeneration energy is fluctuated, so that it may be impossible to supply the new regeneration energy continuously and that a time difference between energy production and energy demand may be generated. From a long-term point of view, there is a limit in the current power system's absorption of new regeneration energy variation. An alternative for controlling the variation of the new regeneration energy is needed.

An electric energy storage system comes to the force as a good method for dealing with intermittent supply of the new regeneration energy in a short time period.

Especially, the energy storage system charges electricity when the power amount is large and discharges electricity when the power consumption is large, only to reduce a difference between power supply and power demand efficiently. Energy storage technology stores the generated electricity uses the electricity when needed, and the energy storage technology is recognized as key technology which will lead the future energy market as a device for enhancing energy use efficiency, for raising new regeneration energy usage and for stabilizing the electric energy storage system.

When using a large scale energy storage apparatus, load factor improvement, peak shaving and electric load leveling are promoted by solving the daily electric load difference. Also, output stability of distributed power and new regeneration energy and improvement of electricity quality can be supported and emergency power supply and high quality power supply can be supported.

FIG. 1 is a conceptual diagram schematically illustrating a range of application of a conventional energy storage system.

The conventional energy storage system shown in FIG. 1 stores the energy generated in an electric power system and uses the stored energy at a time of necessity. An energy storage system installable in a transmission and distribution network is a MW class or larger scale energy storage apparatus. Such the energy storage system may be applicable to diverse fields such as new regeneration energy, industrial facilities, commercial facilities, residential areas and electric power systems.

FIG. 2 is a schematic diagram of a large scale energy storage system in accordance with the prior art and FIG. 3 is a waveform diagram of an inverter module shown in FIG. 2.

The large scale energy storage system shown in FIG. 2 includes a plurality of inverter modules 10 connected in parallel and the plurality of the inverter modules 10 are configured to convert a DC voltage between a DC of a battery (BATT) and a grid into a AC voltage to output the AC voltage.

Between an output terminal of each inverter module 10 and the grid may be arranged an reactor 11 configured to restrict the output currents of the inverter module 10 so as to suppress harmonics from outputting to a power supply and a filter 12 configured to filter the noise generated from the power supply or the noise generated from the inverter.

When switching timing signals (PWM11, PWM12, PWM21 and PWM22) between switch devices (Q11, Q12, Q21 and Q22) provided in the inverter module 10 are different from each other, especially, in case an independent control circuit is provided in each inverter module 10, in the operation of the large scale energy storage system having the structure mentioned above as shown in FIG. 3, "+"-sided switch device Q11 of any one inverter module 10 is switched on and "−"-sided switch device Q22 of another inverter module 10 is switched on. In this instance, a high frequency circulating current is generated by switching between the two inverter modules 10. Current imbalance between the inverter modules 10 is caused by property variation of the switching element, reactor and filter or property variation caused by temperature variation, such that a low frequency circulating current might flow between the inverter modules.

The inverter modules 10 have to be connected in parallel between the DC of the battery and the grid. Accordingly, a driving method of each inverter module 10 or property variation of the inverter modules 10 might cause mutual interference and current imbalance.

In addition, the capacity of the large scale storage system might deteriorate and there might be damage to the switching elements of the inverter modules. Property variation of the inverter modules may be generated by property variation of the switching elements and switching timing, property variation of reactors and filters, and property variation of devices according to temperature variation.

The present disclosure is derived to solve the disadvantages mentioned above and it provides a large scale energy storage system which may operate balanced control of inverter modules connected in parallel so as to control balancing of the inverter modules without signal distortion caused by affection of noise.

SUMMARY OF THE DISCLOSURE

An object of the present disclosure is to provide a large scale energy storage system which may operate balanced control of inverter modules connected in parallel so as to control balancing of the inverter modules without signal distortion caused by affection of noise.

To achieve these objects and other advantages and in accordance with the purpose of the disclosure, as embodied and broadly described herein, a large scale energy storage system enabling balanced control of inverters, the large scale energy storage system includes an inverter controller comprising a PWM generation circuit configured to generate a reference PWM signal and a first O/E converter configured to convert the reference PWM signal transmitted from the PWM generation circuit into an optical signal and to output the optical signal; and a plurality of PCS inverters configured to output a grid voltage, each of the PCS inverters comprising a second O/E converter embedded therein to convert the PWM signal and the optical signal output from the inverter controller into an optical signal and a plurality of inverter modules.

The PWM generation circuit may be provided with an inverter reference output current applied from an external device and the output current and voltage output from each of the PCS inverters, and compensate an error between the reference output current and the output current and voltage and generates the reference PWM signal.

The inverter module may include a PWM compensation circuit configured to calculate a phase and frequency of a grid and to output the PWM signal synchronized with the grid; an inverter comprising a switching element configured to switch a supplied DC power into a AC power; an reactor configured to suppress a harmonic wave from being output to a power supply by restricting the output current of the inverter; a current deviation detector configured to measure a grid voltage with each phase, entire currents flowing the grid and a grid current for each of the inverters, the current deviation detector comprising a filter connected in serial to filter the noise generated from the power supply or the inverter; and a PWM calculator configured to calculate a deviation of the entire currents based on the information detected by the current deviation detector and to supply the calculated deviation to the PWM compensation circuit.

The PWM compensation circuit may compensate current imbalance between the inverter modules and a low frequency circulating current which are caused by property variation or temperature variation of the inverter, the reactor and the filter.

The PWM compensation circuit may generate and supply a compensated PWM signal, having a compensated width and a compensated phase of a pulse corresponding to the deviation, to the inverter, after measuring entire grid currents of each phase and a grid current of the inverter module and calculating a deviation for the entire grid currents.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. It will be understood that although the terms first, second, etc. may be used herein to describe various elements, these elements should not be limited by these terms. These terms are generally only used to distinguish one element from another.

Figure 1:
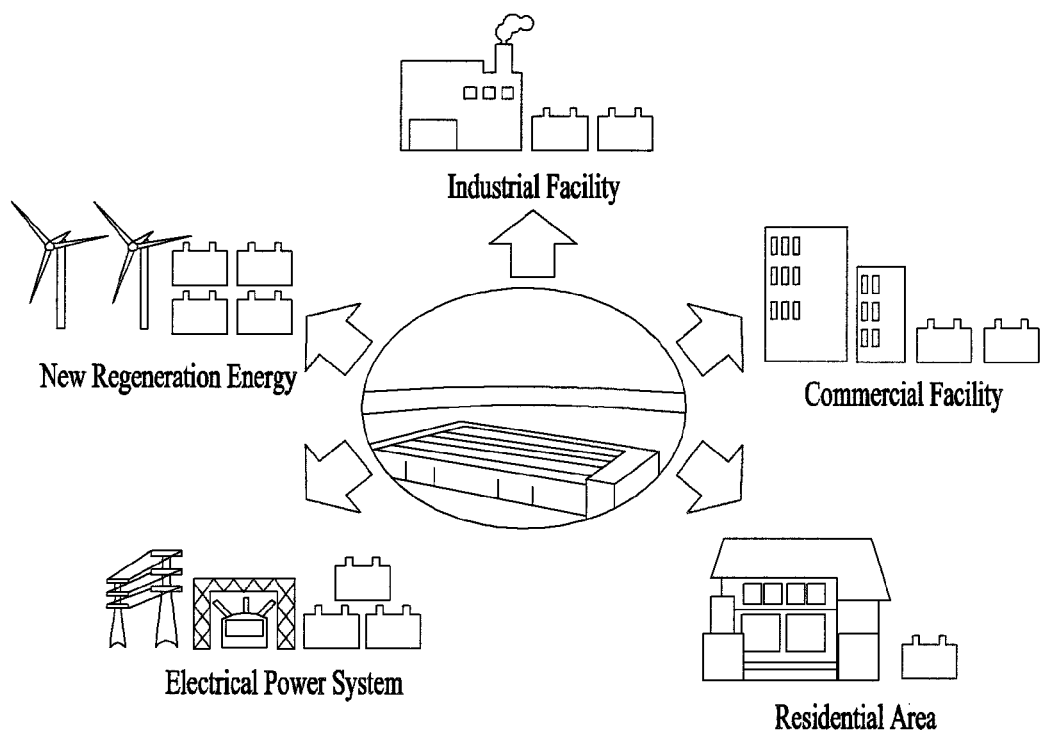
FIG. 1 is a conceptual diagram schematically illustrating a range of application of a conventional energy storage system.
Figure 2:
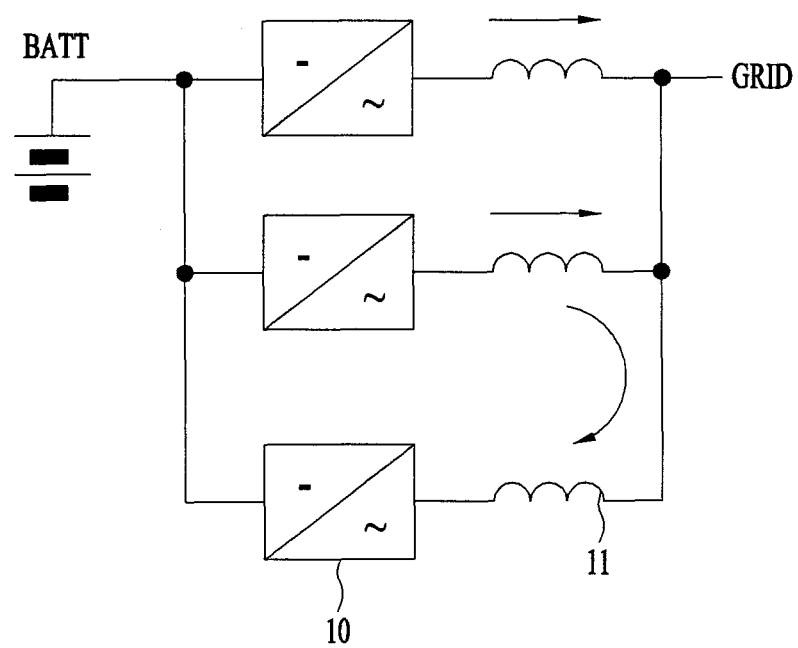
FIG. 2 is a schematic diagram illustrating a large scale energy storage system in accordance with the prior art of the present disclosure.
Figure 3:
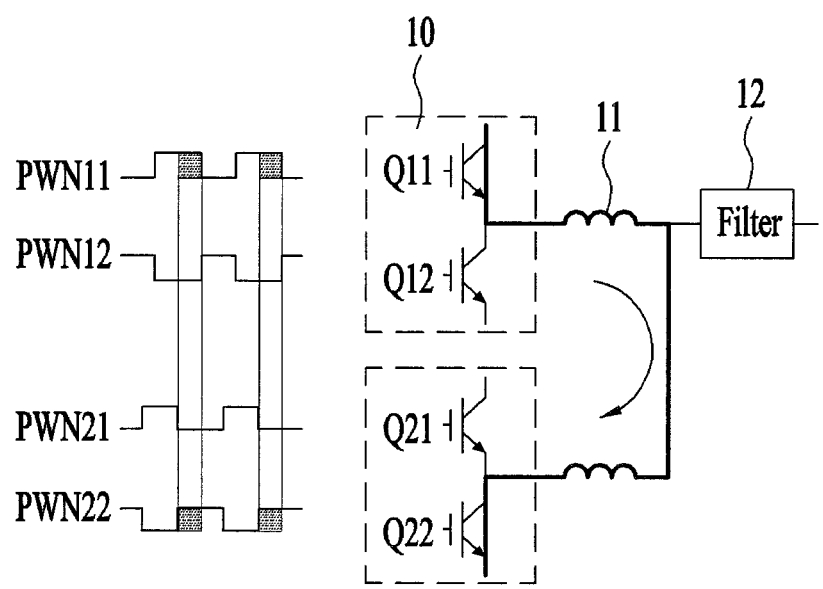
FIG. 3 is a waveform diagram of an inverter module shown in FIG. 2.
Figure 4:
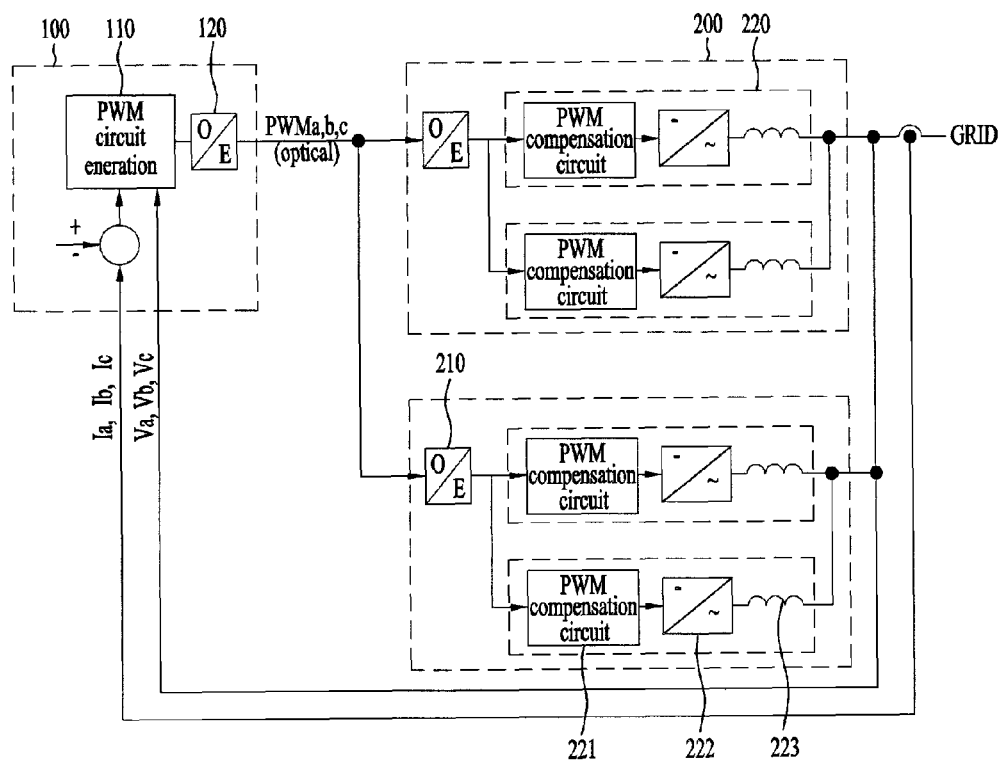
FIG. 4 is a schematic diagram of a large scale energy storage system enabling balanced control between inverter modules in accordance with the present disclosure.
Figure 5:
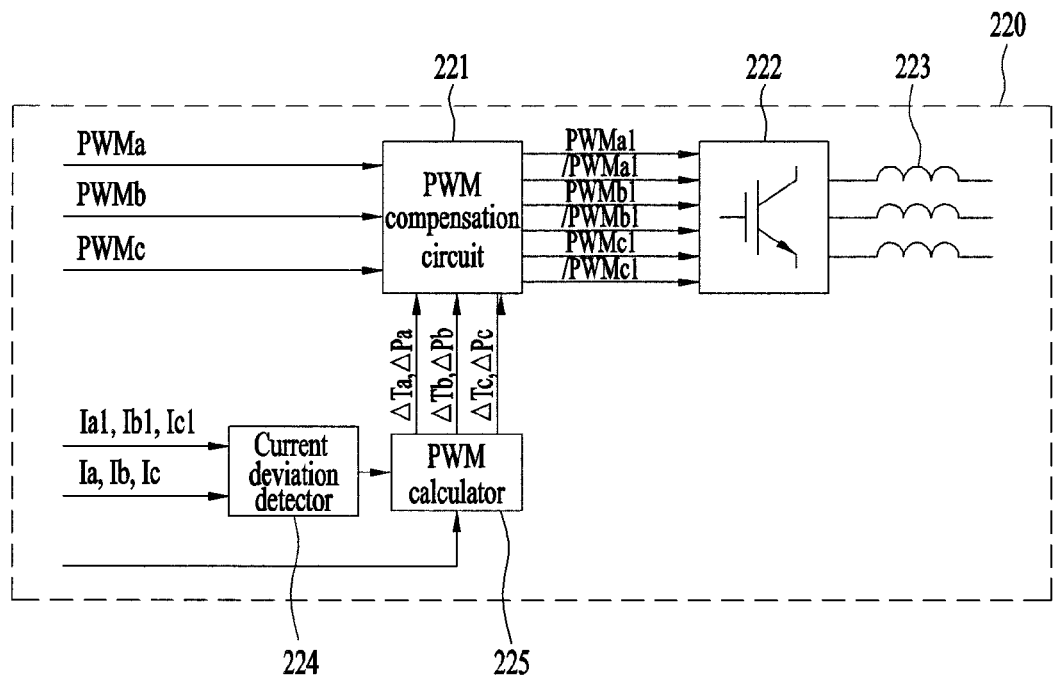
FIG. 5 is a schematic diagram of an inverter module shown in FIG. 4.

FIG. 4 is a schematic diagram of a large scale energy storage system enabling balanced control between inverter modules in accordance with the present disclosure. FIG. 5 is a schematic diagram of an inverter module shown in FIG. 4.

First of all, an energy storage system means technology which stores electricity in an electrical power system to supply an electric power and energy to a necessary location at a time of necessity. In other words, the energy storage system is employed to enhance the quality and efficiency of the electricity. The energy storage system is typically realized by integration of a battery system, an inverter system and a power control system, not by one product such as a conventional secondary cell.

The large scale energy storage system enabling balanced control of inverter modules shown in FIGS. 4 and 5 includes an inverter controller 100 and a plurality of PCS inverters 200 configured to output a grid. The inverter controller 100 includes a PWM generation circuit 110 embedded therein to generate a reference PWM signal and a first O/E (Optical-Electrical) converter converting the reference PWM signal transmitted from the PWM generation circuit 110 into an optical signal to output. The plurality of the PCS inverters 200 includes a second O/E converter 210 converting the PWM signal (PWMa, PWMb and PWMc) and the optical signal output from the inverter controller 100 into an optical signal and a plurality of inverter modules 220 connected in parallel.

The PWM generation circuit 110 is provided with an inverter reference output current (REF) applied from an external device and an output current (Ia, Ib and Ic) and a voltage (Va, Vb and Vc) output from each of the PCS inverters 200 and compensates errors, only to generate a reference PWM signal.

The inverter module 220 includes a PWM compensation circuit 221, an inverter 222, a reactor 223, a current deviation detector 224 and a PWM calculator 225. The PWM compensation circuit 221 calculates a phase and a frequency of a grid and synchronizes the PWM signal with the grid. The inverter 222 has a switching element to convert a received DC power into an AC power. The reactor 223 restricts the output current of the inverter 222 to suppress a harmonic wave from outputting to the power supply. The current deviation detector 224 has a filter (not shown) directly connected thereto to filter the noise transmitted from the power supply or the inverter 222 and it measures a grid voltage (Va, Vb and Vc) of each phase, entire currents (Ia, Ib and Ic) flowing to the grid and a grid current for each inverter. The PWM calculator calculates a deviation of the entire currents based on the information detected by the current deviation detector 224 and supplies the calculated deviation to the PWM compensation circuit 221.

The PWM compensation circuit 221 is the circuit configured to compensate current imbalance and low frequency circulation currents between inverter modules 220 according to property variation or temperature variation of the inverter 222, the reactor 223 and the filter.

Specifically, the PWM compensation circuit 221 measures the entire grid currents (Ia, Ib and Ic) of each phase and the grid currents of the inverter module and calculates a deviation from the entire grid currents. After that, the PWM compensation circuit 221 generated and supplies to the inverter 22 a compensated PWM signal (PWMa1, PWMb1 and PWMc1) having a compensated width of a pulse and a compensated phase corresponding to a deviation for a PWM signal (PWMa, PWMb and PWMc) of each phase.

When a "+" switching element of one inverter module 220 is switched on and "−" switching element of another inverter module 220 is switched on, a current flows between the inverter modules and the high frequency circulating current is generated by the switching of the inverter modules 220 connected in parallel to configurate the PCS inverter 200. The inverter controller 100 generates and supplies the PWM signal (PWMa, PWMb and PWMc) to each of the inverter modules 220. Accordingly, switching elements of each inverter module 220 are switched at the same timing and the high frequency circulating current caused by the switching timing may be suppressed.

Each of the inverter 220 may include a plurality of semiconductor switching elements, for example, Insulated Gate Bipolar Transistors (IGBT).

The large scale energy storage system enabling the balanced control between the inverters may connect the plurality of the PCS inverters 200 in parallel, each of the PCS inverters 200 having the plurality of the inverter modules 220. When one inverter controller 100 transmits the PWM signal (PWMa, PWMb and PWMc) to each of the PCS inverters 200, each of the PCS inverters 200 re-transmits the PWM signal to each of the inverter modules 220 having the PWM compensation function only to the switching elements of the inverter module 200.

The O/E converters 120 and 210 are embedded in the inverter controller 100 and the PCS inverter 200, respectively, so that the PWM signal between the inverter controller 100 and each PCS inverter 200 may be converted into an optical signal and the optical signal may be transmitted to prevent the signal distortion caused by noise.

Accordingly, even though the large scale energy storage system enabling the balanced control between the inverters may be configured by connecting the plurality of the small-capacity inverter modules, the inverter modules may be balancedly controlled.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A large scale energy storage system enabling balanced control of inverters, the large scale energy storage system comprising:
    an inverter controller comprising a PWM generation circuit configured to generate a reference PWM signal and a first O/E converter configured to convert the reference PWM signal transmitted from the PWM generation circuit into an optical signal and to output the optical signal; and
    a plurality of PCS inverters configured to output a grid voltage, each of the PCS inverters comprising a second O/E converter embedded therein to convert the PWM signal and the optical signal output from the inverter controller into an optical signal and a plurality of inverter modules.

2. The large scale energy storage system enabling the balanced control of the inverters of claim 1, wherein the PWM generation circuit is provided with an inverter reference output current applied from an external device and the output current and voltage output from each of the PCS inverters, and compensates an error between the reference output current and the output current and voltage and generates the reference PWM signal.

3. The scale energy storage system enabling the balanced control of the inverters of claim 1, wherein the inverter module comprises,
    a PWM compensation circuit configured to calculate a phase and frequency of a grid and to output the PWM signal synchronized with the grid;
    an inverter comprising a switching element configured to switch a supplied DC power into an AC power;
    a reactor configured to suppress a harmonic wave from being output to a power supply by restricting the output current of the inverter;
    a current deviation detector configured to measure a grid voltage with each phase, entire currents flowing the grid and a grid current for each of the inverters, the current deviation detector comprising a filter connected in serial to filter the noise generated from the power supply or the inverter; and
    a PWM calculator configured to calculate a deviation of the entire currents based on the information detected by the current deviation detector and to supply the calculated deviation to the PWM compensation circuit.

4. The scale energy storage system enabling the balanced control of the inverters of claim 3, wherein the PWM compensation circuit compensates current imbalance between the inverter modules and a low frequency circulating current which are caused by property variation or temperature variation of the inverter, the reactor and the filter.

5. The scale energy storage system enabling the balanced control of the inverters of claim 4, wherein the PWM compensation circuit generates and supplies a compensated PWM signal, having a compensated width and a compensated phase of a pulse corresponding to the deviation, to the inverter, after measuring entire grid currents of each phase and a grid current of the inverter module and calculating a deviation for the entire grid currents.

* * * * *